US012249166B2

United States Patent
Jeong

(10) Patent No.: US 12,249,166 B2
(45) Date of Patent: Mar. 11, 2025

(54) SYSTEM AND METHOD FOR TRIGGERING VIDEO RECORDING FOR THE AREA AROUND A VEHICLE IN SCENARIOS WHERE COLLISIONS WITH THE VEHICLE ARE DETECTED WHILE THE VEHICLE IS PARKED

(71) Applicants: HYUNDAI MOTOR COMPANY, Seoul (KR); Kia Corporation, Seoul (KR)

(72) Inventor: Dong Hyuk Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 18 days.

(21) Appl. No.: 17/486,163

(22) Filed: Sep. 27, 2021

(65) Prior Publication Data
US 2022/0358318 A1    Nov. 10, 2022

(30) Foreign Application Priority Data

May 7, 2021    (KR) .......................... 10-2021-0059369

(51) Int. Cl.
| | | |
|---|---|---|
| G06K 9/00 | (2022.01) | |
| B60R 1/00 | (2022.01) | |
| B60R 21/013 | (2006.01) | |
| B60W 30/08 | (2012.01) | |
| B60W 40/08 | (2012.01) | |

(Continued)

(52) U.S. Cl.
CPC ............. *G06V 20/59* (2022.01); *B60W 30/08* (2013.01); *B60W 40/08* (2013.01); *G06V 20/56* (2022.01)

(58) Field of Classification Search
CPC ..................................................... B60W 30/08
See application file for complete search history.

(56) References Cited

U.S. PATENT DOCUMENTS

| | | | |
|---|---|---|---|
| 2013/0096731 A1* | 4/2013 | Tamari ................ | G06F 11/3058 701/1 |
| 2019/0289446 A1* | 9/2019 | Kim ....................... | H04W 4/00 |

(Continued)

FOREIGN PATENT DOCUMENTS

| | | | |
|---|---|---|---|
| KR | 101535610 B1 * | 12/2013 | ............. B62D 41/00 |
| KR | 20160066412 A * | 12/2014 | |

(Continued)

OTHER PUBLICATIONS

KR-20210072474-A—Machine Translation (Year: 2019).*

(Continued)

*Primary Examiner* — Jess Whittington
*Assistant Examiner* — Rami Nabih Bedewi
(74) *Attorney, Agent, or Firm* — MORGAN, LEWIS & BOCKIUS LLP

(57) ABSTRACT

The present disclosure relates to a system for recording a video of driving and a method for operating the same. The system includes a non-transitory memory, and a processor connected to the non-transitory memory, and the processor detects a location of a driver and a state of a door of a vehicle when an impact on the vehicle is sensed during parking, and performs at least one of an impact sensing video storage or an impact sensing notification service based on the driver location and the state of the door.

12 Claims, 7 Drawing Sheets

(51) Int. Cl.
*B60W 50/14* (2020.01)
*G06V 20/56* (2022.01)
*G06V 20/59* (2022.01)

(56) References Cited

U.S. PATENT DOCUMENTS

| | | | |
|---|---|---|---|
| 2019/0344750 A1* | 11/2019 | Takata | B60N 2/0278 |
| 2020/0017049 A1* | 1/2020 | Kobayashi | B60W 30/08 |
| 2020/0406860 A1* | 12/2020 | Mai | B60R 25/31 |
| 2021/0039601 A1* | 2/2021 | Moeller | G06F 21/88 |
| 2021/0122330 A1* | 4/2021 | Sung | B60R 25/305 |
| 2021/0409657 A1* | 12/2021 | Tomizawa | G06V 10/56 |

FOREIGN PATENT DOCUMENTS

| | | | |
|---|---|---|---|
| KR | 102053268 B1 * | 12/2017 | G07C 5/00 |
| KR | 102292505 B1 * | 12/2019 | G07C 5/00 |
| KR | 20210072474 A * | 12/2019 | |
| KR | 20210129819 A * | 4/2020 | |

OTHER PUBLICATIONS

KR-20160066412-A—Machine Translation (Year: 2014).*
KR-20210129819-A—Machine Translation (Year: 2020).*
KR101535610B1—Machine Translation—Lim et al. (Year: 2013).*
KR102292505B1—Machine Translation—Son et al. (Year: 2019).*
KR102053268B1—Machine Translation—Noh et al. (Year: 2017).*

* cited by examiner

SYSTEM AND METHOD FOR TRIGGERING VIDEO RECORDING FOR THE AREA AROUND A VEHICLE IN SCENARIOS WHERE COLLISIONS WITH THE VEHICLE ARE DETECTED WHILE THE VEHICLE IS PARKED

CROSS-REFERENCE TO RELATED APPLICATION

This application claims the benefit of priority to Korean Patent Application No. 10-2021-0059369, filed in the Korean Intellectual Property Office on May 7, 2021, the entire contents of which are incorporated herein by reference.

TECHNICAL FIELD

The present disclosure relates to a system for recording a video of driving and a method for operating the same.

BACKGROUND

A built-in drive video record system is a device that records and stores a video of a surrounding region of a vehicle using a front camera and a rear camera during travel or parking. The built-in drive video record system sensitively alters an impact sensing sensitivity during turn off (key off) of the vehicle.

The built-in drive video record system recognizes an impact that occurs when a driver opens or closes a door for boarding or alighting and ignores the corresponding impact, so that unnecessary impact sensing video storage and impact sensing notification are not performed. That is, the built-in drive video record system uses door opening/closing information to filter an impact sensing event, so that the unnecessary impact sensing video storage and impact sensing notification are prevented in case of alighting after the vehicle off (the key off) or vehicle on (key on) after the boarding.

However, it is impossible to prevent unnecessary impact sensing by filtering the impact event using the door opening and closing information in following conditions.

① a case in which the driver moves excessively inside the vehicle without opening or closing the door in the vehicle off condition ② a case of opening the door, alighting with a vehicle movement (vibration/impact, etc.) enough to sense a vehicle vibration after a certain period of time, and then, closing the door after a certain period of time ③ a case of opening the door, boarding with the vehicle movement (the vibration/the impact, or the like) enough to sense the vehicle vibration after a certain time, and then, closing the door after a certain time ④ a case in which the driver generates an impact independent of the door opening and closing Therefore, unnecessary impact sensing videos are stored in a storage space of the built-in drive video record system and occupy a capacity, and the impact sensing notification is unnecessarily transmitted to the user (e.g., the driver) through a connectivity service, which are inconvenience.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a system for recording a video of driving that performs an impact sensing video storage and an impact sensing notification service based on a driver location and a door state when an impact occurs on a vehicle during parking, and a method for operating the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for recording a video of driving includes a non-transitory memory, and a processor connected to the non-transitory memory, and the processor detects a location of a driver and a state of a door of a vehicle when an impact on the vehicle is sensed during parking, and performs at least one of an impact sensing video storage or an impact sensing notification service based on the driver location and the state of the door.

In one implementation, the system may further include a sensor for measuring an impact value when the impact occurs on the vehicle.

In one implementation, the processor may determine to perform the impact sensing video storage and the impact sensing notification service when the impact value measured by the sensor exceeds a preset reference impact value, the driver is not located in the vehicle, and the driver is not located within a critical radius from the vehicle with the door of the vehicle open.

In one implementation, the processor may perform the impact sensing video storage when the impact value measured by the sensor exceeds a preset reference impact value, and perform the impact sensing notification service when the driver is not located in the vehicle and the driver is not located within a critical radius from the vehicle with the door of the vehicle open.

In one implementation, the processor may ignore the sensed impact when the measured impact value does not exceed the reference impact value, when the driver is located in the vehicle, or when the driver is located within the critical radius from the vehicle with the door of the vehicle open.

In one implementation, the processor may variably set an impact sensing sensitivity based on the driver location and the state of the door.

In one implementation, the processor may set the impact sensing sensitivity to a first impact sensing sensitivity during first parking when the driver is not located in a vehicle, and the driver is not located within a critical radius from the vehicle with the door of the vehicle open.

In one implementation, the processor may set the impact sensing sensitivity to a second impact sensing sensitivity during second parking to be less sensitive compared to the first impact sensing sensitivity during the first parking when the driver is located in the vehicle, or when the driver is located within the critical radius from the vehicle with the door of the vehicle open.

In one implementation, the processor may determine whether an impact value measured by a sensor exceeds a reference impact value based on the impact sensing sensitivity, perform the impact sensing video storage and perform the impact sensing notification service when the measured impact value exceeds the reference impact value based on the impact sensing sensitivity, and ignore the sensed impact when the measured impact value does not exceed the reference impact value based on the impact sensing sensitivity.

In one implementation, the processor may detect the driver location and the state of the door through a body controller.

According to another aspect of the present disclosure, a method for operating a system for recording a video of driving includes sensing an impact on a vehicle during parking, detecting a location of a driver and a state of a door of the vehicle when sensing the impact, and performing at least one of an impact sensing video storage or an impact sensing notification service based on the driver location and the state of the door.

In one implementation, the sensing an impact may include measuring an impact value using a sensor.

In one implementation, the performing at least one of an impact sensing video storage or an impact sensing notification service may include determining whether the measured impact value exceeds a preset reference impact value, determining whether the driver is located in the vehicle when the measured impact value exceeds the reference impact value, determining whether the driver is located within a critical radius from the vehicle with the door of the vehicle open when the driver is not located in the vehicle, and performing the impact sensing video storage and performing the impact sensing notification service when the driver is not located within the critical radius from the vehicle with the door of the vehicle open.

In one implementation, the performing at least one of an impact sensing video storage or an impact sensing notification service may include determining whether the measured impact value exceeds a preset reference impact value, performing the impact sensing video storage when the measured impact value exceeds the reference impact value, determining whether the driver is located in the vehicle after determining to perform the impact sensing video storage, determining whether the driver is located within a critical radius from the vehicle with the door of the vehicle open when the driver is not located in the vehicle, and performing the impact sensing notification service when the driver is not located within the critical radius from the vehicle with the door of the vehicle open.

In one implementation, the performing at least one of an impact sensing video storage or an impact sensing notification service may further include ignoring the sensed impact when the measured impact value does not exceed the preset reference impact value, when the driver is located in the vehicle, or when the driver is located within the critical radius from the vehicle with the door of the vehicle open.

In one implementation, the method may further include variably setting an impact sensing sensitivity based on the driver location and the state of the door during the parking, sensing the impact based on the variably set impact sensing sensitivity, and storing the impact sensing video and performing the impact sensing notification service when sensing the impact.

In one implementation, the variably setting an impact sensing sensitivity may include determining whether the driver is located in the vehicle, determining whether the driver is located within a critical radius from the vehicle with the door of the vehicle open when the driver is not located in the vehicle, and setting the impact sensing sensitivity to a first impact sensing sensitivity during first parking when the driver is not located within the critical radius from the vehicle with the door of the vehicle open.

In one implementation, the variably setting an impact sensing sensitivity may further include setting the impact sensing sensitivity to a second impact sensing sensitivity during second parking to be less sensitive compared to the first impact sensing sensitivity during the first parking when the driver is located in the vehicle, or when the driver is located within the critical radius from the vehicle with the door of the vehicle open.

In one implementation, the sensing the impact based on the variably set impact sensing sensitivity may include determining whether an impact value measured by a sensor exceeds a reference impact value based on the impact sensing sensitivity.

In one implementation, the method may further include performing the impact sensing video storage and performing the impact sensing notification service when the measured impact value exceeds the reference impact value based on the impact sensing sensitivity, and ignoring the sensed impact when the measured impact value does not exceed the reference impact value based on the impact sensing sensitivity.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
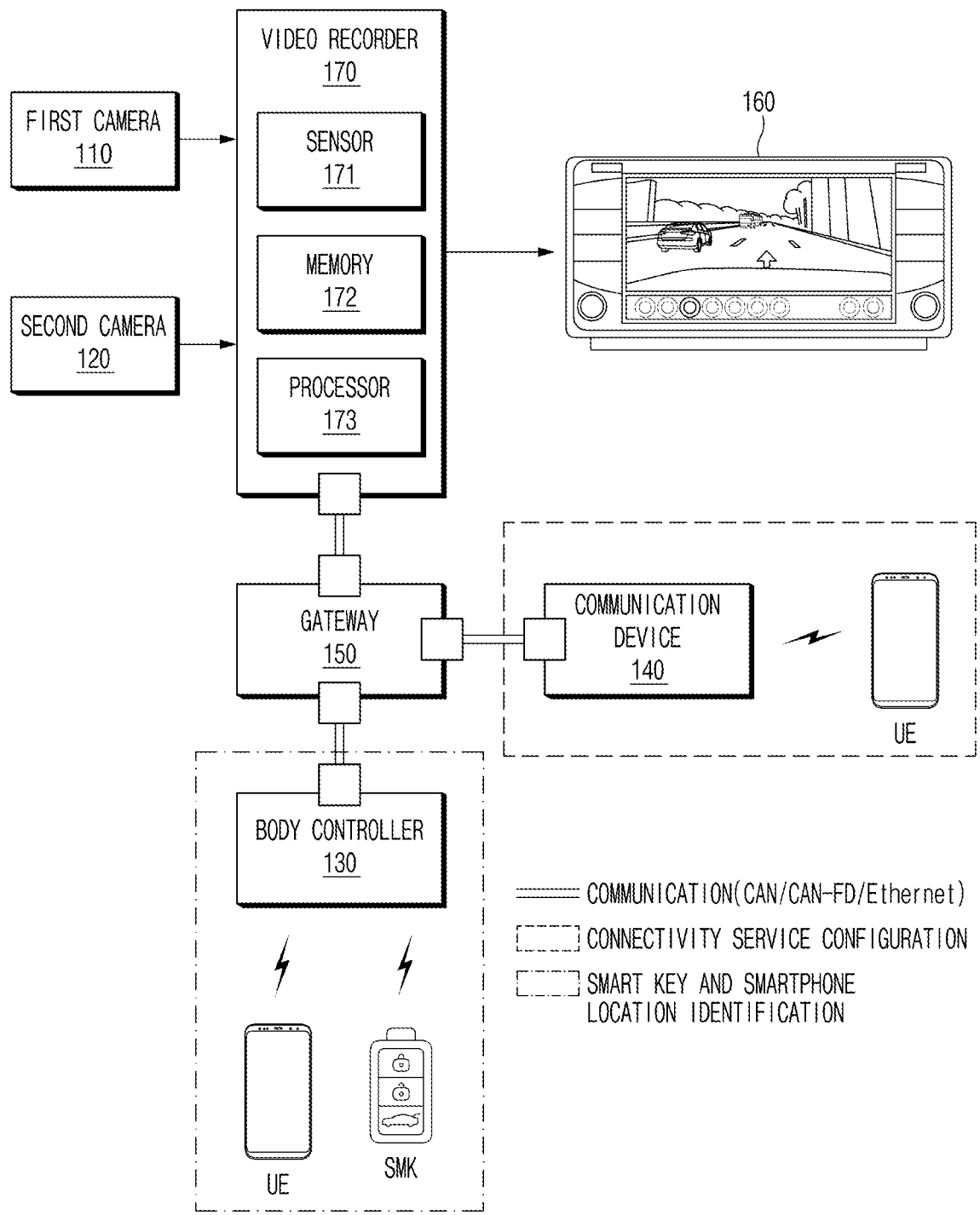
FIG. 1 is a block diagram illustrating a drive video record system according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a drive video record system according to embodiments of the present disclosure.

A drive video record system 100 may be built in a vehicle and may perform at-all-times recording, event recording, or manual recording of a video of a surrounding region during travel or parking and store the video of the surrounding region. In addition, the drive video record system 100 may identify an impact occurrence cause based on a location of a driver and a door state when sensing an impact during the parking, and perform an impact sensing video storage and/or an impact sensing notification service based on the impact occurrence cause.

Referring to FIG. 1, the drive video record system 100 may include a first camera 110, a second camera 120, a body controller 130, a communication device 140, a gateway 150, an output device 160, and a video recorder 170.

The first camera 110 and the second camera 120 may be respectively mounted at different locations of the vehicle, and respectively shoot videos of surrounding regions. For example, the first camera 110 may be installed at a front portion of the vehicle to shoot a video of a region ahead of the vehicle, and the second camera 120 may be installed at a rear portion of the vehicle to shoot a video or a region at the rear of the vehicle. Although it is disclosed in FIG. 1 that the two cameras 110 and 120 are installed in the vehicle, the present disclosure may not be limited thereto, and three or more cameras may be installed at different locations. For example, the cameras may be respectively installed at the front portion, the rear portion, and a side portion of the vehicle.

The body controller 130 may detect the driver location and transmit the detected driver location to the video recorder 170. The body controller 130 may detect a location of a user (e.g., the driver) in possession of a smart key (SMK) through a plurality of low frequency (LF) antennas mounted inside the vehicle. In addition, the body controller 130 may measure (detect) a location of a user equipment (UE) using an ultrawideband (UWB) technology. The user equipment (UE) may be a smartphone or the like that may serve as a vehicle key. In the present embodiment, the body controller 130 is described as detecting the driver location, but the present disclosure is not limited thereto. Other controllers (electric control units, ECUs) in the vehicle may be implemented to detect the driver location.

The communication device 140 may support a connectivity service using a wireless communication network. The wireless communication network may be a wireless Internet network (e.g., a Wi-Fi), a short-range network, and/or a mobile communication network. The communication device 140 may transmit an impact sensing notification to the user equipment (UE) in response to a request (an instruction) of the video recorder 170.

The gateway 150 may serve to connect heterogeneous vehicle communication networks (or communication domains) to each other. When the body controller 130, the communication device 140, and the video recorder 170 use different vehicle communication networks, the body controller 130, the communication device 140, and the video recorder 170 may exchange data (information) with each other through the gateway 150. When the body controller 130, the communication device 140, and the video recorder 170 use the same vehicle communication network, the information may be exchanged with each other without going through the gateway 150. The vehicle communication network may be implemented as a controller area network (CAN), a CAN with flexible data rate (CAN-FD), a media oriented systems transport (MOST), a local interconnect network (LIN), an ethernet, and/or an X-by-Wire (Flexray).

The output device 160 may output visual information, auditory information, and the like. The output device 160 may play and output a video. The output device 160 may be implemented as an audio video navigation (AVN), an infotainment system, or the like.

The video recorder 170 may record the videos shot by the first camera 110 and the second camera 120 at all times, in an occurrence of an event, or in response to a manual command of the user during the travel or the parking based on user setting. The video recorder 170 may include a sensor 171, a memory 172, a processor 173, and the like. The video recorder 170 may be implemented in a form of a system on chip (SoC).

The sensor 171 may sense the impact occurring on the vehicle. The sensor 171 may measure an impact value (or an amount of impact) when the impact occurs on the vehicle. The sensor 171 may transmit the measured impact value (a sensed value) to the processor 173. The sensor 171 may be implemented as an acceleration sensor (a G sensor) that measures an acceleration generated by the impact and/or a vibration.

The memory 172 may store the videos shot (acquired) by the first camera 110 and/or the second camera 120. The memory 172 may store an impact sensing sensitivity, a recording scheme, and the like preset by the user (e.g., the driver). The memory 172 may store a lookup table in which an impact sensing criterion, that is, a reference impact value, based on the impact sensing sensitivity is defined. The impact sensing sensitivity may be classified into a travel impact sense sensitivity, an impact sensing sensitivity during the parking, a first impact sensing sensitivity during first parking, and/or a second impact sensing sensitivity during second parking. The recording scheme may be classified into at-all-times recording during the travel, event recording during the travel, at-all-times recording during the parking, and/or event recording during the parking. The event recording during the travel and the event recording during the parking are schemes of recording the video when the event such as the impact sensing or the like occurs.

The memory 172 may be a non-transitory storage medium that stores instructions executed by the processor 173. The memory 172 may further include a non-volatile medium such as a hard disk drive (HDD), a solid state disk (SSD), an embedded multimedia card (eMMC), and/or a universal flash storage (UFS). The memory 172 may be implemented as at least one of storage media of a secure digital card (SD card), a random access memory (RAM), a static random access memory (SRAM), a read only memory (ROM), programmable read only memory (PROM), an electrically erasable and programmable ROM (EEPROM), an erasable and programmable ROM (EPROM), a register, a removable memory, a web storage, and the like.

The processor 173 may control overall operations of the video recorder 170. The processor 173 may be implemented as at least one of processing devices of an application specific integrated circuit (ASIC), a digital signal processor (DSP), a programmable logic device (PLD), a field programmable gate arrays (FPGA), a central processing unit (CPU), a microcontroller, and/or a microprocessor.

The processor 173 may perform the video recording using the first camera 110 and the second camera 120 based on the user setting such as the preset recording scheme, the impact sensing sensitivity, and the like. When the recording scheme is set to the event recording during the parking, the processor 173 may convert the impact sensing sensitivity during the parking from the travel impact sensing sensitivity to the impact sensing sensitivity during the parking. That is, the processor 173 may change (vary) the impact sensing criterion when a vehicle state is switched from a travel state to a parking state. The processor 173 may recognize a vehicle off or key off state or the like as the parking state.

The processor 173 may determine whether there is the impact based on the impact value measured by the sensor 171. The processor 173 may determine whether the impact value measured by the sensor 171 exceeds the impact sensing criterion (the reference impact value). The processor 173 may determine the impact when the measured impact value exceeds the impact sensing criterion. The processor 173 may ignore the sensed impact when the measured impact value does not exceed the impact sensing criterion. The impact sensing criterion may be changed based on the preset impact sensing sensitivity.

The processor 173 may identify (detect) the driver location and the door state through communication with the body controller 130 during the parking. When the driver is located in the vehicle or when the driver is located within a critical radius from the vehicle with the door open, the processor 173 may ignore the sensed impact.

The processor 173 may determine whether to store the impact sensing video and perform the impact sensing notification service based on the driver location and the door state when sensing the impact during the parking. The processor 173 may store the videos shot by the first camera 110 and the second camera 120 as the impact sensing videos in the memory 172 based on the determination. In addition, the processor 173 may transmit the impact sensing notification to the user equipment (UE) using the communication device 140 based on the determination.

As an example, in a case in which the driver is not located in the vehicle and the driver is not located within the critical radius from the vehicle with the vehicle door open when the impact is sensed, the processor 173 may store the impact sensing video in the memory 172 and transmit the impact sensing notification to the user equipment (UE). In other words, when the impact value measured by the sensor 171 exceeds the reference impact value, the driver is not located in the vehicle, and the driver is not located within the predetermined critical radius from the vehicle with the vehicle door open, the processor 173 may determine to store the impact sensing video and perform the impact sensing notification service. Based on the determination, the processor 173 may store the videos shot by the first camera 110 and the second camera 120 within a predetermined time range based on an impact sensing time point. For example, the processor 173 may store a video between −10 seconds and +10 seconds based on the impact sensing time point as the impact sensing video when sensing the impact. In addition, the processor 173 may transmit the notification notifying the impact sensing to a smartphone of the driver based on the determination.

As another example, the processor 173 may store the impact sensing video in the memory 172 immediately when sensing the impact. In other words, when the impact value measured by the sensor 171 exceeds the reference impact value, the processor 173 may store the videos shot by the first camera 110 and the second camera 120 within the predetermined time range based on the impact sensing time point. Thereafter, the processor 173 may determine whether to perform the impact sensing notification service based on the driver location and the door state. When the driver is not inside the vehicle and the driver is not within the critical radius from the vehicle with the vehicle door open, the processor 173 may transmit the impact sensing notification to the user equipment. When the driver is inside the vehicle or the driver is located within the critical radius from the vehicle with the vehicle door open, the processor 173 may ignore the sensed impact without servicing the impact sensing notification.

As another example, the processor 173 may variably set the impact sensing sensitivity based on the driver location and the door state during the parking. When the driver is not in the vehicle and the driver is not within the critical radius from the vehicle with the vehicle door open, the processor 173 may change the impact sensing sensitivity to first impact sensing sensitivity during the first parking. In addition, when the driver is in the vehicle or the driver is within the critical radius from the vehicle with the vehicle door open, the processor 173 may change the impact sensing sensitivity to the second impact sensing sensitivity during the second parking to be less sensitive than the first impact sensing sensitivity during the first parking. The processor 173 may measure the impact value using the sensor 171 after changing the impact sensing sensitivity. When the measured impact value exceeds the reference impact value based on the set impact sensing sensitivity, the processor 173 may store the impact sensing video in the memory 172 and transmit the impact sensing notification to the user equipment (UE). When the measured impact value does not exceed the reference impact value based on the set impact sensing sensitivity, the processor 173 may ignore the sensed impact.

Figure 2:
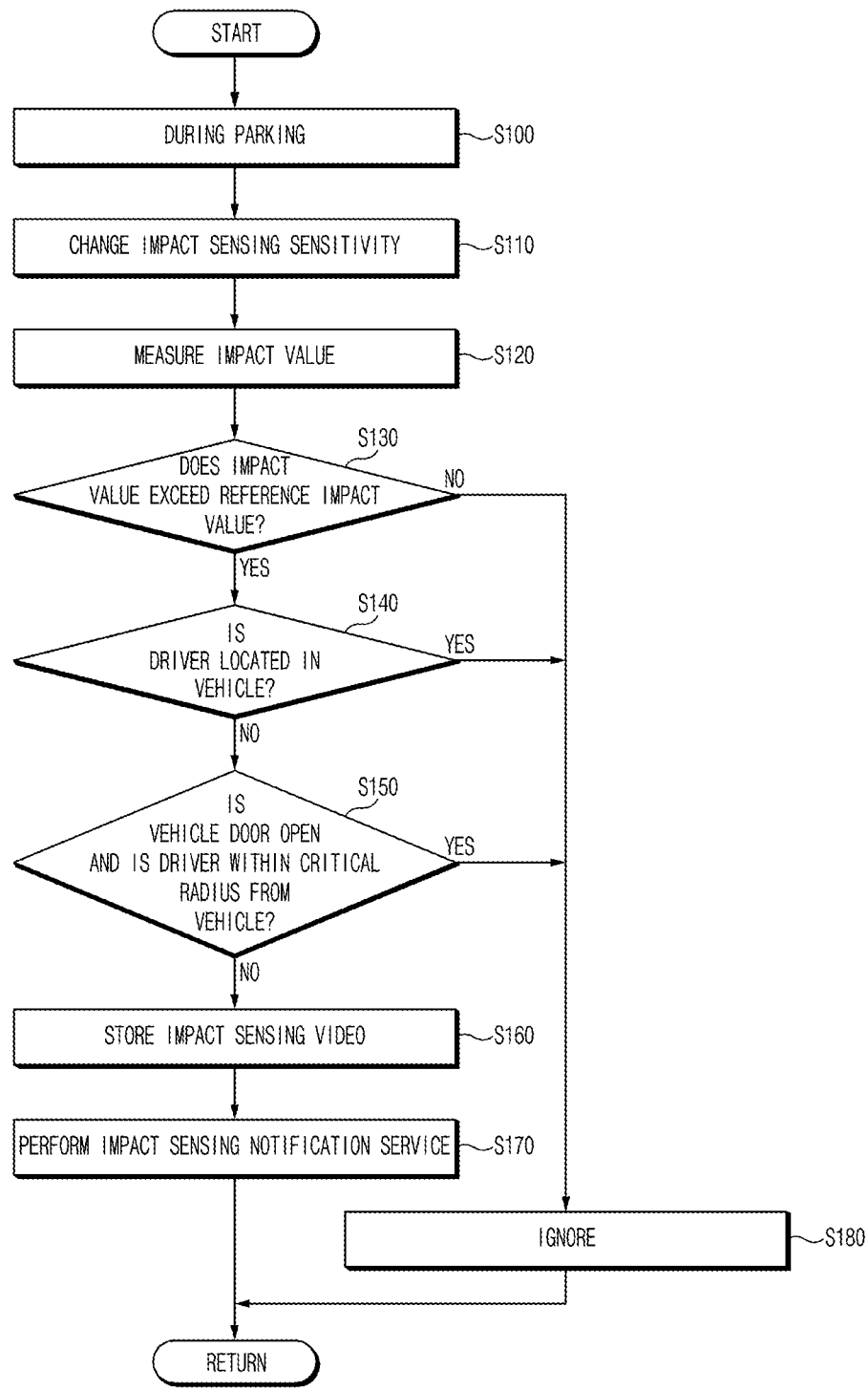
FIG. 2 is a flowchart illustrating a method for operating a drive video record system according to a first embodiment of the present disclosure.

FIG. 2 is a flowchart illustrating a method for operating a drive video record system according to a first embodiment of the present disclosure.

Referring to FIG. 2, the processor 173 may determine whether the vehicle is parked (S100). When the vehicle state is switched from the travel state to the parking state, the processor 173 may recognize this. For example, the processor 173 may recognize that the vehicle is being parked at a time of the key off.

The processor 173 may change the impact sensing sensitivity during the parking (S110). The processor 173 may change the impact sensing sensitivity from the travel impact sensing sensitivity to the impact sensing sensitivity during the parking when the vehicle state is switched from the travel state to the parking state.

The processor 173 may measure the impact value using the sensor 171 (S120). The sensor 171 may measure the acceleration resulted from the impact and/or the vibration, and transmit the measured acceleration to the processor 173 as the impact value.

The processor 173 may determine whether the measured impact value exceeds the reference impact value (S130). The reference impact value may be changed based on the preset impact sensing sensitivity.

The processor 173 may determine whether the driver is in the vehicle when the measured impact value exceeds the reference impact value (S140). The processor 173 may determine whether the driver is located in the vehicle through the body controller 130. The body controller 130 may measure the location of the smart key possessed by the driver using a LF communication or measure the location of the user equipment (UE) (e.g., the smartphone) possessed by the driver using the UWB technology, and transmit the measured location information to the processor 173 of the video recorder 170.

When the driver is not in the vehicle, the processor 173 may determine whether the vehicle door is open and whether the driver is within the critical radius from the vehicle (S150). The processor 173 may determine whether the vehicle door is open through the body controller 130 and may also identify the driver location.

The processor 173 may store the impact sensing video when the vehicle door is open and the driver is not within the critical radius from the vehicle (S160). The processor 173 may store the videos shot by the first camera 110 and the second camera 120 in the memory 172 within the predetermined time range based on the impact sensing time point.

The processor 173 may perform the impact sensing notification service (S170). The processor 173 may transmit the impact sensing notification to the user equipment (UE) possessed by the driver using the communication device 140.

When the impact value measured in S130 does not exceed the reference impact value, when the driver is in the vehicle in S140, or when the driver is within the critical radius from the vehicle with the vehicle door open in S150, the processor 173 may ignore the sensed impact (S180). The processor 173 may not perform the impact sensing video storage and the impact sensing notification service.

Figure 3:
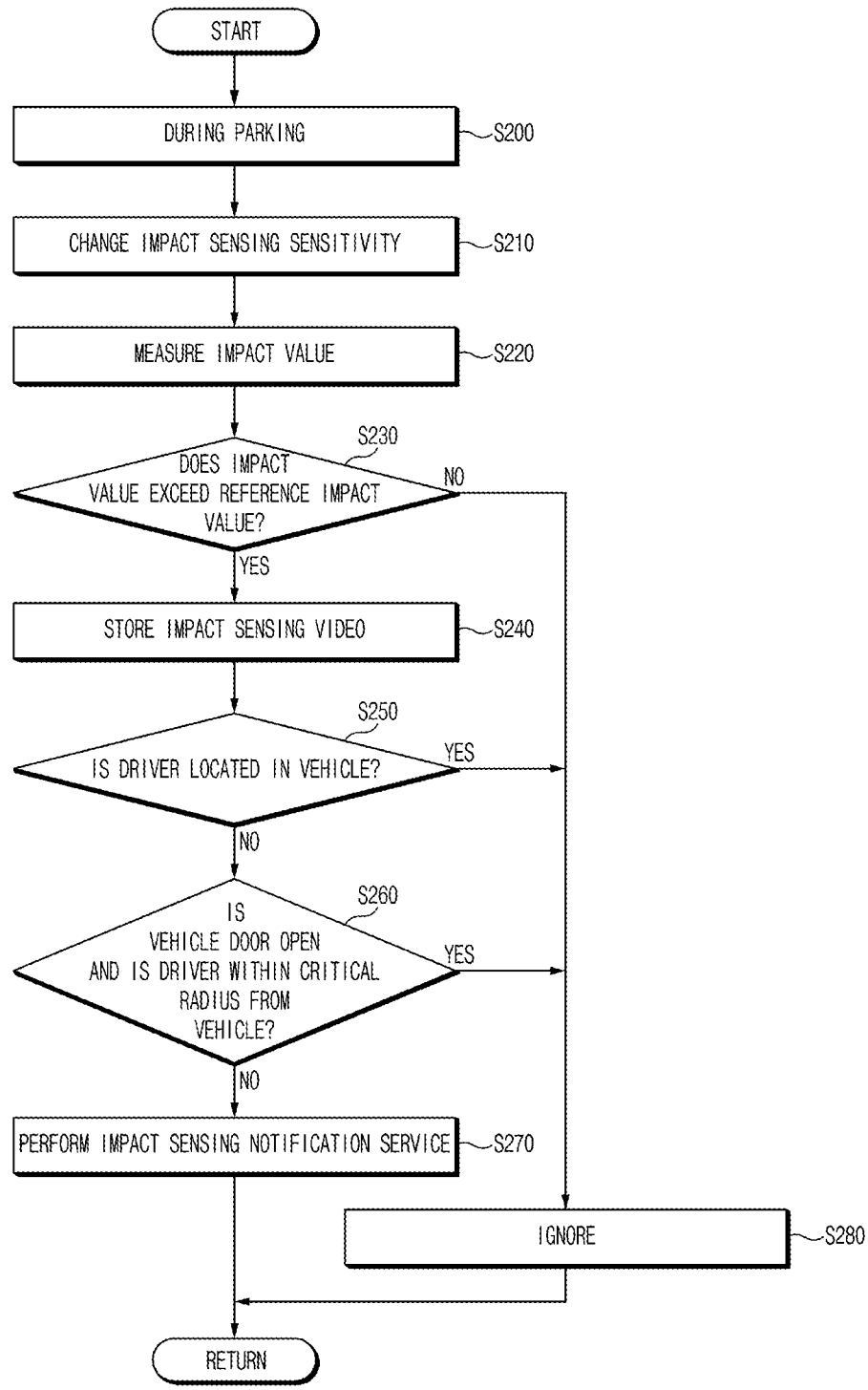
FIG. 3 is a flowchart illustrating a method for operating a drive video record system according to a second embodiment of the present disclosure.

FIG. 3 is a flowchart illustrating a method for operating a drive video record system according to a second embodiment of the present disclosure.

The processor 173 may change the impact sensing sensitivity during the parking (S200 and S210). When the vehicle is being parked, the processor 173 may change the impact sensing sensitivity to the predetermined impact sensing sensitivity during the parking.

The processor 173 may measure the impact value using the sensor 171 (S220). The sensor 171 may be the G sensor that measures the acceleration generated by the impact and/or the vibration. The sensor 171 may transmit the measured acceleration value to the processor 173.

The processor 173 may determine whether the measured impact value exceeds the reference impact value based on the changed impact sensing sensitivity (S230).

The processor 173 may store the impact sensing video when the measured impact value exceeds the reference impact value (S240). The processor 173 may store the videos shot by the first camera 110 and the second camera 120 in the memory 172 within the predetermined time range based on the impact sensing time point.

The processor 173 may determine whether the driver is in the vehicle (S250). The processor 173 may identify the driver location using the body controller 130, and determine whether the driver is located inside the vehicle based on the identified driver location.

When the driver is not in the vehicle, the processor 173 may determine whether the vehicle door is open and whether the driver is within the critical radius from the vehicle (S260). The processor 173 may determine whether the driver is within the critical radius from the vehicle with the vehicle door open based on the information such as the driver location and the door state provided from the body controller 130.

When the vehicle door is open and the driver is not within the critical radius from the vehicle, the processor 173 may perform the impact sensing notification service (S270). The processor 173 may transmit the impact sensing notification to the user equipment (UE) possessed by the driver using the communication device 140.

When the impact value measured in S230 does not exceed the reference impact value, when the driver is in the vehicle in S250, or when the driver is within the critical radius from the vehicle with the vehicle door open in S260, the processor 173 may ignore the sensed impact (S280). The processor 173 may not perform the impact sensing video storage and the impact sensing notification service.

Figure 4:
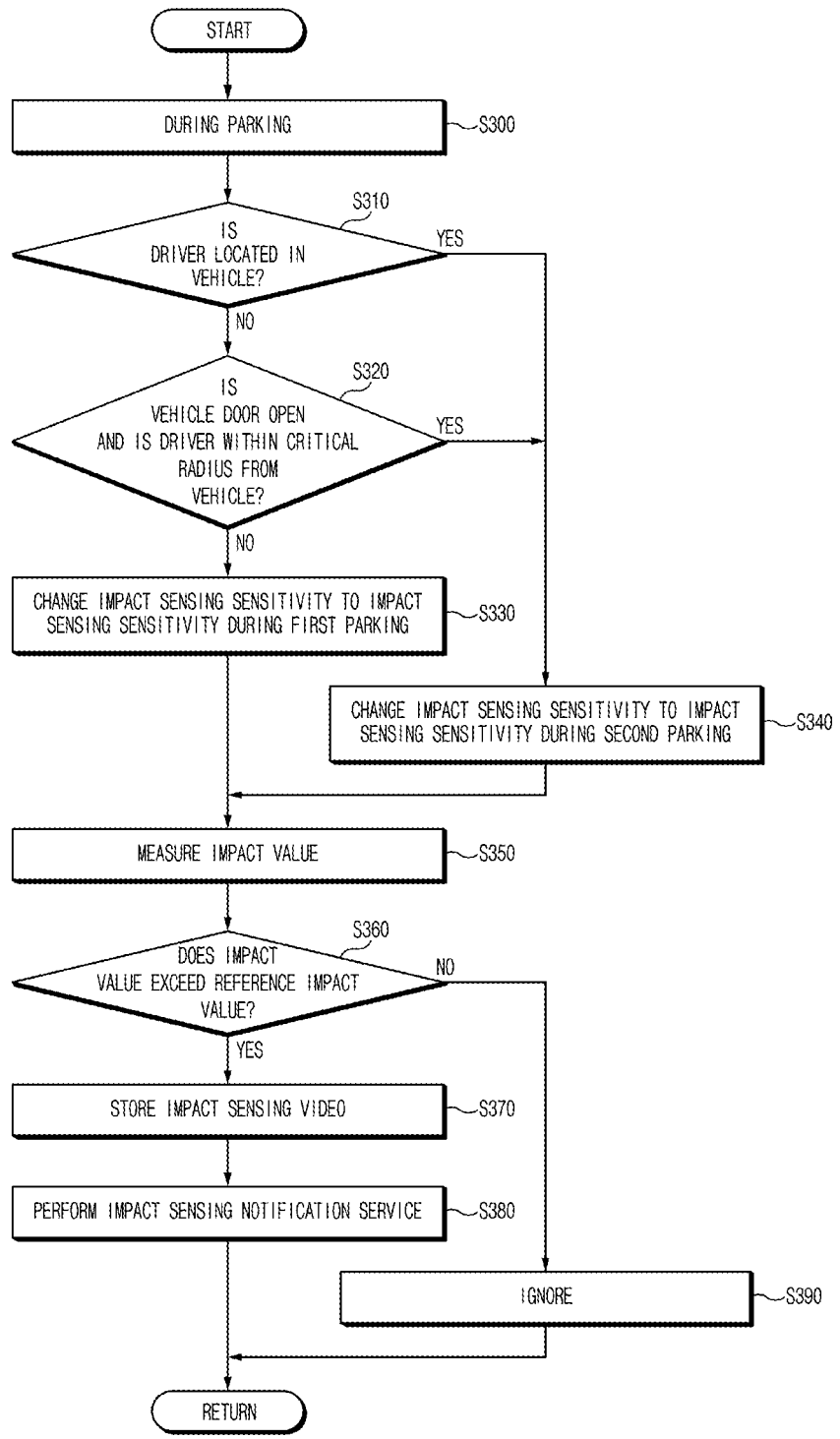
FIG. 4 is a flowchart illustrating a method for operating a drive video record system according to a third embodiment of the present disclosure.
Figure 5:
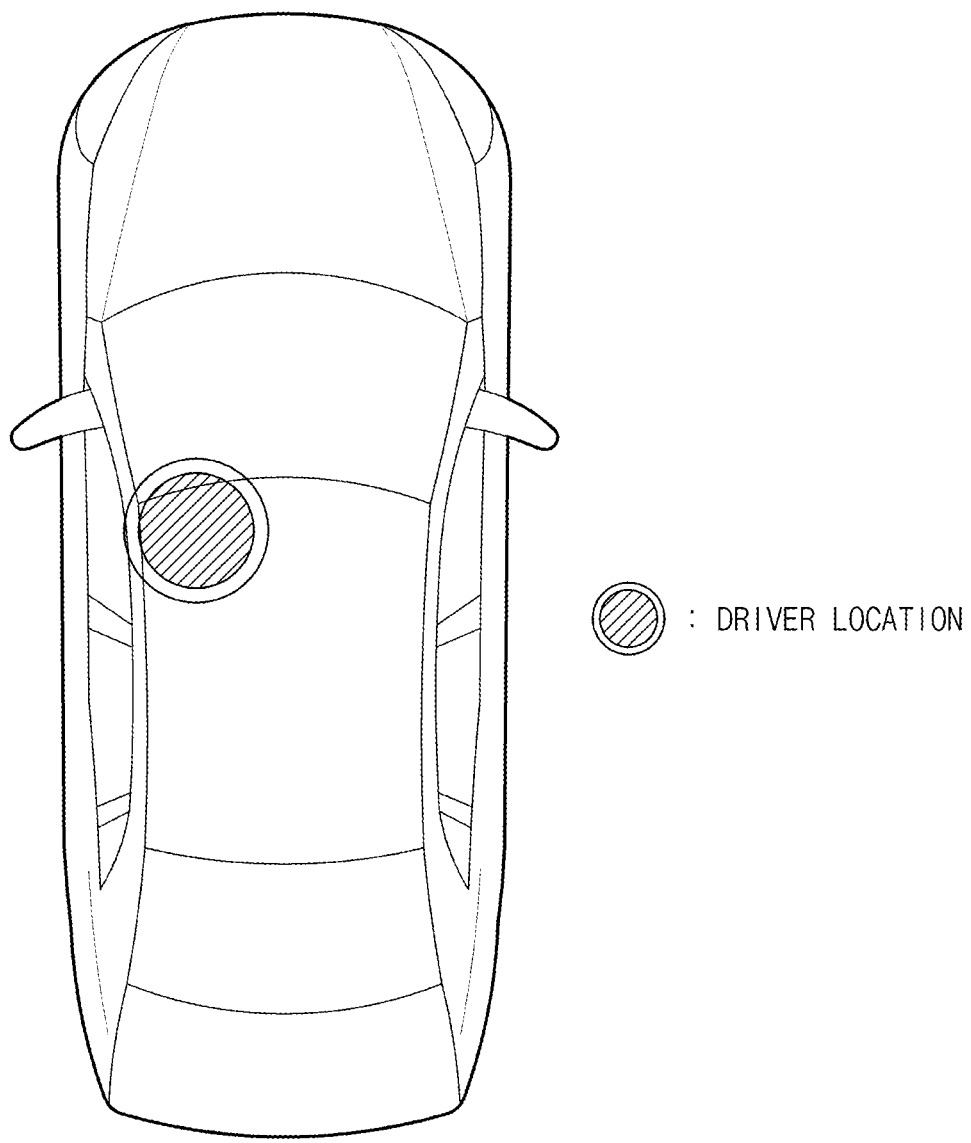
FIGS. 5 and 6 are exemplary diagrams illustrating driver locations according to embodiments of the present disclosure.
Figure 6:
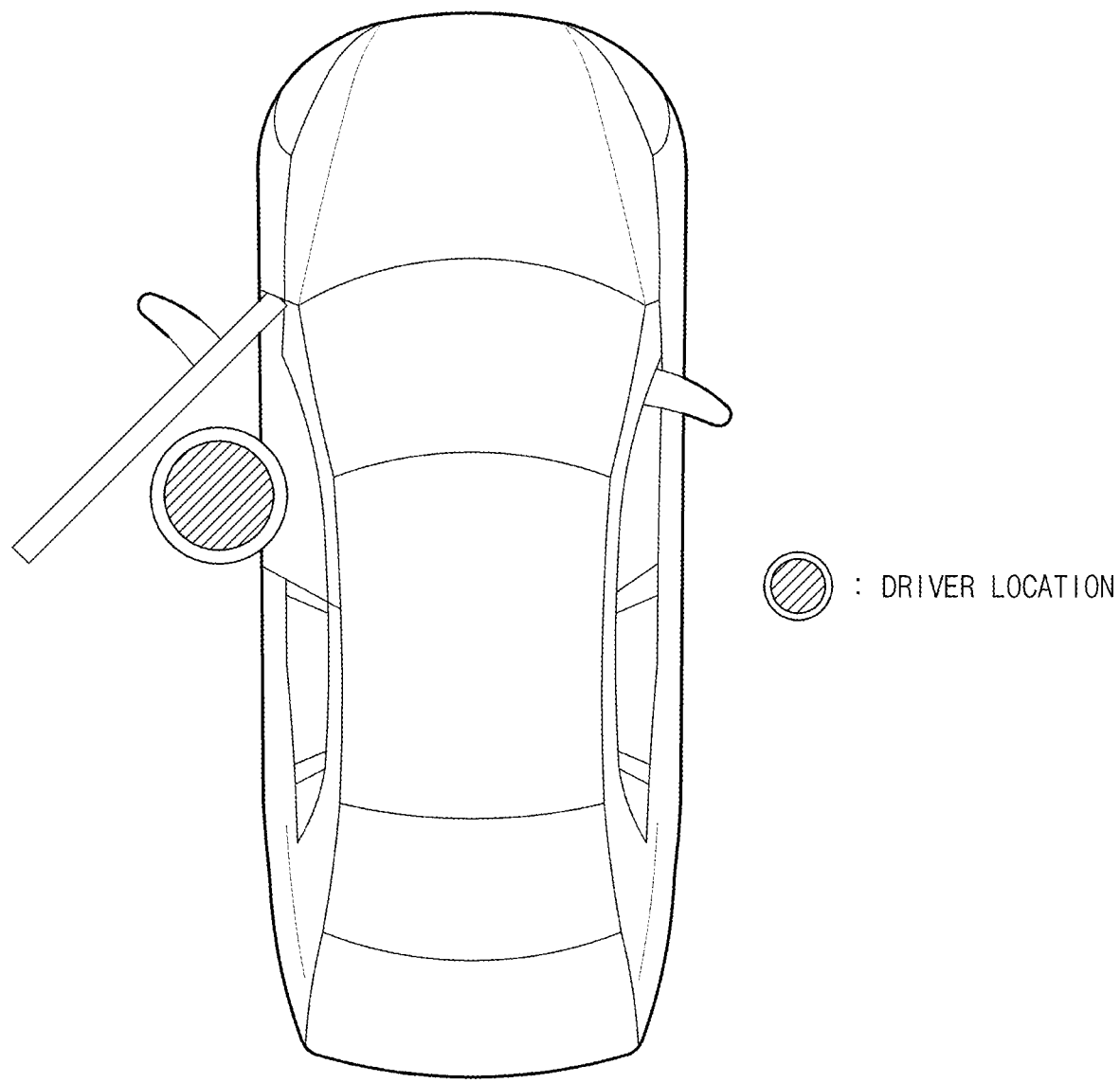

FIG. 4 is a flowchart illustrating a method for operating a drive video record system according to a third embodiment of the present disclosure, and FIGS. 5 and 6 are exemplary diagrams illustrating driver locations according to embodiments of the present disclosure.

The processor 173 may recognize that the vehicle is in the parking state (S300). The processor 173 may determine whether the vehicle is parked through communication with other ECUs in the vehicle.

The processor 173 may determine whether the driver is in the vehicle during the parking (S310). The processor 173 may identify the driver location using the body controller 130 and determine whether the driver is located inside the vehicle based on the identified driver location.

When the driver is not in the vehicle, the processor 173 may determine whether the vehicle door is open and whether the driver is within the critical radius from the vehicle (S320). The processor 173 may determine whether the driver is within the critical radius from the vehicle with the vehicle door open based on the information such as the driver location and the door state provided from the body controller 130.

When the vehicle door is open and the driver is not within the critical radius from the vehicle, the processor 173 may change the impact sensing sensitivity to the first impact sensing sensitivity during the first parking (S330).

When the driver is in the vehicle in S310, or when the vehicle door is open and the driver is within the critical radius from the vehicle in S320, the processor 173 may change the impact sensing sensitivity to the second impact sensing sensitivity during the second parking (S340). The second impact sensing sensitivity during the second parking may be less sensitive compared to the first impact sensing sensitivity during the first parking. In other words, when the driver is located inside the vehicle as shown in FIG. 5 or when the driver is located within the critical radius from the vehicle with the vehicle door open as shown in FIG. 6, the processor 173 may set the impact sensing sensitivity to be less sensitive than the first impact sensing sensitivity during the first parking.

The processor 173 may measure the impact value using the sensor 171 after S330 or S340 (S350). The sensor 171 may be the G sensor that measures the acceleration generated by the impact and/or the vibration.

The processor 173 may determine whether the measured impact value exceeds the reference impact value based on the changed impact sensing sensitivity (S360). When the impact sensing sensitivity is set as the first impact sensing sensitivity during the first parking, the processor 173 may use a reference impact value based on the first impact sensing sensitivity during the first parking as the impact sensing criterion. When the impact sensing sensitivity is set as the second impact sensing sensitivity during the second parking, the processor 173 may use a reference impact value based on the second impact sensing sensitivity during the second parking as the impact sensing criterion.

The processor 173 may store the impact sensing video when the measured impact value exceeds the reference impact value (S370). The processor 173 may store the videos shot by the first camera 110 and the second camera 120 in the memory 172 within the predetermined time range based on the impact sensing time point.

The processor 173 may perform the impact sensing notification service (S380). The processor 173 may transmit the impact sensing notification to the user equipment (UE) possessed by the driver using the communication device 140.

When the impact value measured in S360 does not exceed the reference impact value, the processor 173 may ignore the sensed impact (S390). The processor 173 may not perform the impact sensing video storage and the impact sensing notification service.

According to the above embodiments, when the driver is located in the vehicle as shown in FIG. 5 or when the driver is located near a driver's seat with a driver's seat door open as shown in FIG. 6 at a time of sensing the impact during the parking, because the drive video record system 100 ignores the sensed impact, unnecessary impact sensing video storage and impact sensing notification service may not be performed.

Figure 7:
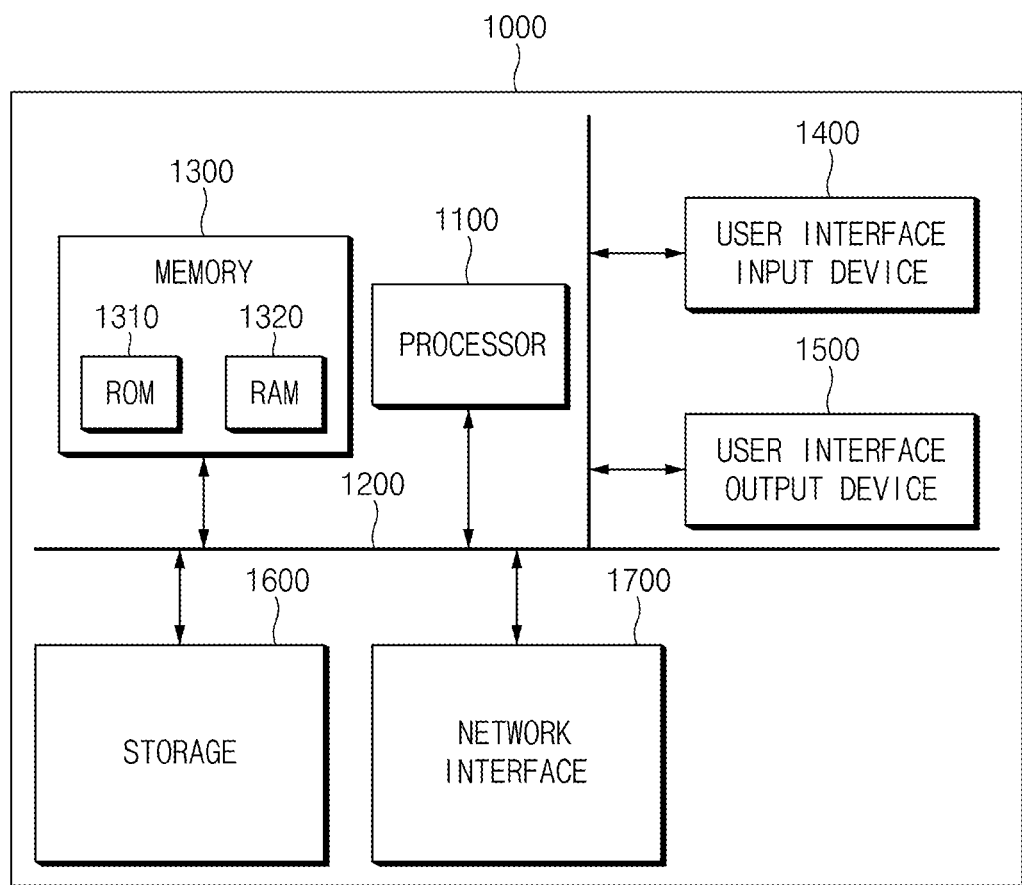
FIG. 7 is a block diagram showing a computing system executing a method for operating a drive video record system according to embodiments of the present disclosure.

FIG. 7 is a block diagram showing a computing system executing a method for operating a drive video record system according to embodiments of the present disclosure.

With reference to FIG. 7, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user equipment. In another method, the processor 1100 and the storage medium may reside as individual components in the user equipment.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, when the impact occurs on the vehicle during the parking, because the impact sensing video storage and the impact sensing notification service are performed based on the driver location and the door state, the unnecessary impact sensing video storage and impact sensing notification by the impact caused by the driver's movement during the parking may be prevented.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for triggering video recording for the area around a vehicle in scenarios where collisions with the vehicle are detected while the vehicle is parked, the system comprising:
   a sensor for measuring an impact value when an impact occurs on the vehicle;
   a non-transitory memory; and
   a processor connected to the non-transitory memory,
   wherein the processor is configured to:
   detect a location of a driver and a state of a door of a vehicle while the vehicle is parked,
   variably set an impact sensing sensitivity based on the driver location and the state of the door,
   sense the impact on the vehicle based on the impact sensing sensitivity, and
   perform at least one of an impact sensing video storage or an impact sensing notification service based on the driver location and the state of the door after sensing the impact on the vehicle,
   wherein the processor is further configured to ignore the sensed impact when the measured impact value does not exceed a preset reference impact value,
   wherein the preset reference impact value is changed based on the impact sensing sensitivity,
   wherein the processor is further configured to:
   set the impact sensing sensitivity to a first impact sensing sensitivity during first parking when the driver is not located in a vehicle, and the driver is not located within a predetermined critical radius from the vehicle with the door of the vehicle open, and
   set the impact sensing sensitivity to a second impact sensing sensitivity during second parking to be less sensitive compared to the first impact sensing sensitivity during the first parking when the driver is located in the vehicle, or when the driver is located within the predetermined critical radius from the vehicle with the door of the vehicle open.

2. The system of claim 1, wherein the processor is further configured to determine to perform the impact sensing video storage and the impact sensing notification service when the impact value measured by the sensor exceeds the preset reference impact value, the driver is not located in the vehicle, and the driver is not located within a predetermined critical radius from the vehicle with the door of the vehicle open.

3. The system of claim 1, wherein the processor is further configured to:

perform the impact sensing video storage when the impact value measured by the sensor exceeds the preset reference impact value, and perform the impact sensing notification service when the driver is not located in the vehicle and the driver is not located within a predetermined critical radius from the vehicle with the door of the vehicle open.

4. The system of claim 3, wherein the processor is further configured to ignore the sensed impact when the driver is located in the vehicle, or when the driver is located within the predetermined critical radius from the vehicle with the door of the vehicle open.

5. The system of claim 1, wherein the processor is further configured to:

determine whether the impact value measured by the sensor exceeds the preset reference impact value based on the impact sensing sensitivity, perform the impact sensing video storage and perform the impact sensing notification service when the measured impact value exceeds the preset reference impact value based on the impact sensing sensitivity, and ignore the sensed impact when the measured impact value does not exceed the preset reference impact value based on the impact sensing sensitivity.

6. The system of claim 1, wherein the processor is further configured to detect the driver location and the state of the door through a body controller.

7. A method for triggering video recording for the area around a vehicle in scenarios where collisions with the vehicle are detected while the vehicle is parked, the method comprising:

detecting a location of a driver and a state of a door of the vehicle while the vehicle is parked;

variably setting an impact sensing sensitivity based on the driver location and the state of the door;

sensing an impact on the vehicle based on the impact sensing sensitivity; and performing at least one of an impact sensing video storage or an impact sensing notification service based on the driver location and the state of the door after sensing the impact on the vehicle, wherein the sensing an impact includes measuring an impact value using a sensor, wherein the performing at least one of an impact sensing video storage or an impact sensing notification service includes ignoring the sensed impact when the measured impact value does not exceed a preset reference impact value, wherein the preset reference impact value is changed based on the impact sensing sensitivity, wherein the method further comprises:

sensing the impact based on the variably set impact sensing sensitivity; and storing the impact sensing video and performing the impact sensing notification service when sensing the impact, and wherein the variably setting an impact sensing sensitivity includes:

determining whether the driver is located in the vehicle;

determining whether the driver is located within a predetermined critical radius from the vehicle with the door of the vehicle open when the driver is not located in the vehicle;

setting the impact sensing sensitivity to a first impact sensing sensitivity during first parking when the driver is not located within the predetermined critical radius from the vehicle with the door of the vehicle open; and setting the impact sensing sensitivity to a second impact sensing sensitivity during second parking to be less sensitive compared to the first impact sensing sensitivity during the first parking when the driver is located in the vehicle, or when the driver is located within the predetermined critical radius from the vehicle with the door of the vehicle open.

8. The method of claim 7, wherein the performing at least one of an impact sensing video storage or an impact sensing notification service further includes:

determining whether the measured impact value exceeds the preset reference impact value;

determining whether the driver is located in the vehicle when the measured impact value exceeds the preset reference impact value;

determining whether the driver is located within a predetermined critical radius from the vehicle with the door of the vehicle open when the driver is not located in the vehicle; and performing the impact sensing video storage and performing the impact sensing notification service when the driver is not located within the predetermined critical radius from the vehicle with the door of the vehicle open.

9. The method of claim 7, wherein the performing at least one of an impact sensing video storage or an impact sensing notification service further includes:

determining whether the measured impact value exceeds the preset reference impact value;

performing the impact sensing video storage when the measured impact value exceeds the preset reference impact value;

determining whether the driver is located in the vehicle after determining to perform the impact sensing video storage;

determining whether the driver is located within a predetermined critical radius from the vehicle with the door of the vehicle open when the driver is not located in the vehicle; and performing the impact sensing notification service when the driver is not located within the predetermined critical radius from the vehicle with the door of the vehicle open.

10. The method of claim 9, wherein the performing at least one of an impact sensing video storage or an impact sensing notification service further includes:

ignoring the sensed impact when the driver is located in the vehicle, or when the driver is located within the predetermined critical radius from the vehicle with the door of the vehicle open.

11. The method of claim 7, wherein the sensing the impact based on the variably set impact sensing sensitivity includes:

determining whether the impact value measured by the sensor exceeds the preset reference impact value based on the impact sensing sensitivity.

12. The method of claim 11, further comprising:

performing the impact sensing video storage and performing the impact sensing notification service when the measured impact value exceeds the preset reference impact value based on the impact sensing sensitivity; and ignoring the sensed impact when the measured impact value does not exceed the preset reference impact value based on the impact sensing sensitivity.

* * * * *